(12) United States Patent
Staroselsky et al.

(10) Patent No.: US 8,037,849 B1
(45) Date of Patent: Oct. 18, 2011

(54) METHOD AND SYSTEM FOR FUEL SUPPLY TO A PUMP-INJECTOR UNIT OF A DIESEL ENGINE

(75) Inventors: Naum Staroselsky, Sunny Isles Beach, FL (US); Lev M. Gurarye, Sunny Isles Beach, FL (US)

(73) Assignee: Ultimate Combustion Company, Deerfield Beach, FL (US)

( * ) Notice: Subject to any disclaimer, the term of this patent is extended or adjusted under 35 U.S.C. 154(b) by 0 days.

(21) Appl. No.: 13/050,584

(22) Filed: Mar. 17, 2011

(51) Int. Cl.
*F02M 17/22* (2006.01)
(52) U.S. Cl. .................................. 123/1 A; 123/522
(58) Field of Classification Search ............. 123/1 A, 123/522, 525–527, 27 GE, 575
See application file for complete search history.

(56) References Cited

U.S. PATENT DOCUMENTS

| | | | |
|---|---|---|---|
| 4,596,210 A | | 6/1986 | Schmidtke |
| 5,522,368 A | * | 6/1996 | Tusino ..................... 123/522 |
| 5,836,290 A | * | 11/1998 | Gilbert ..................... 123/522 |
| 6,273,072 B1 | | 8/2001 | Knapstein et al. |
| 7,011,048 B2 | | 3/2006 | Gurin et al. |
| 7,406,955 B1 | | 8/2008 | Gachik et al. |
| 7,523,747 B2 | | 4/2009 | Gachik et al. |

* cited by examiner

*Primary Examiner* — Thomas Moulis
(74) *Attorney, Agent, or Firm* — Laurence A. Greenberg; Werner H. Stemer; Ralph E. Locher

(57) ABSTRACT

A fuel supply to unit pump-injector systems of diesel engines includes a gasification and saturation of the liquid diesel fuel. A first fuel line delivers the fuel to a low pressure pump driven by an engine shaft which pumps the fuel to a common low pressure fuel manifold. There, the fuel is distributed for injection by the pump-injector units of the engine cylinders. A second fuel line delivers the fuel to a feed pump that feeds through a plurality of nozzles into a gasification vessel. The vessel is pressurized with a gas (e.g., carbon dioxide, air, etc.) a pressure level $P_2$. There, the fuel is saturated with pressurized gas, which is dissolved in the fuel. The solution is then pumped by a second electro motor driven pump that further increases the solution pressure up to a level $P_3$, which is higher than the pressure level $P_1$. At that point, the solution becomes under-saturated and it is fed to the fuel manifold for injection into the engine. A feedback system for the fuel with further pressure and temperature control is provided by the system. The system, and specifically its pumps and the fill level of the gasification vessel, is controlled by a control system.

6 Claims, 1 Drawing Sheet

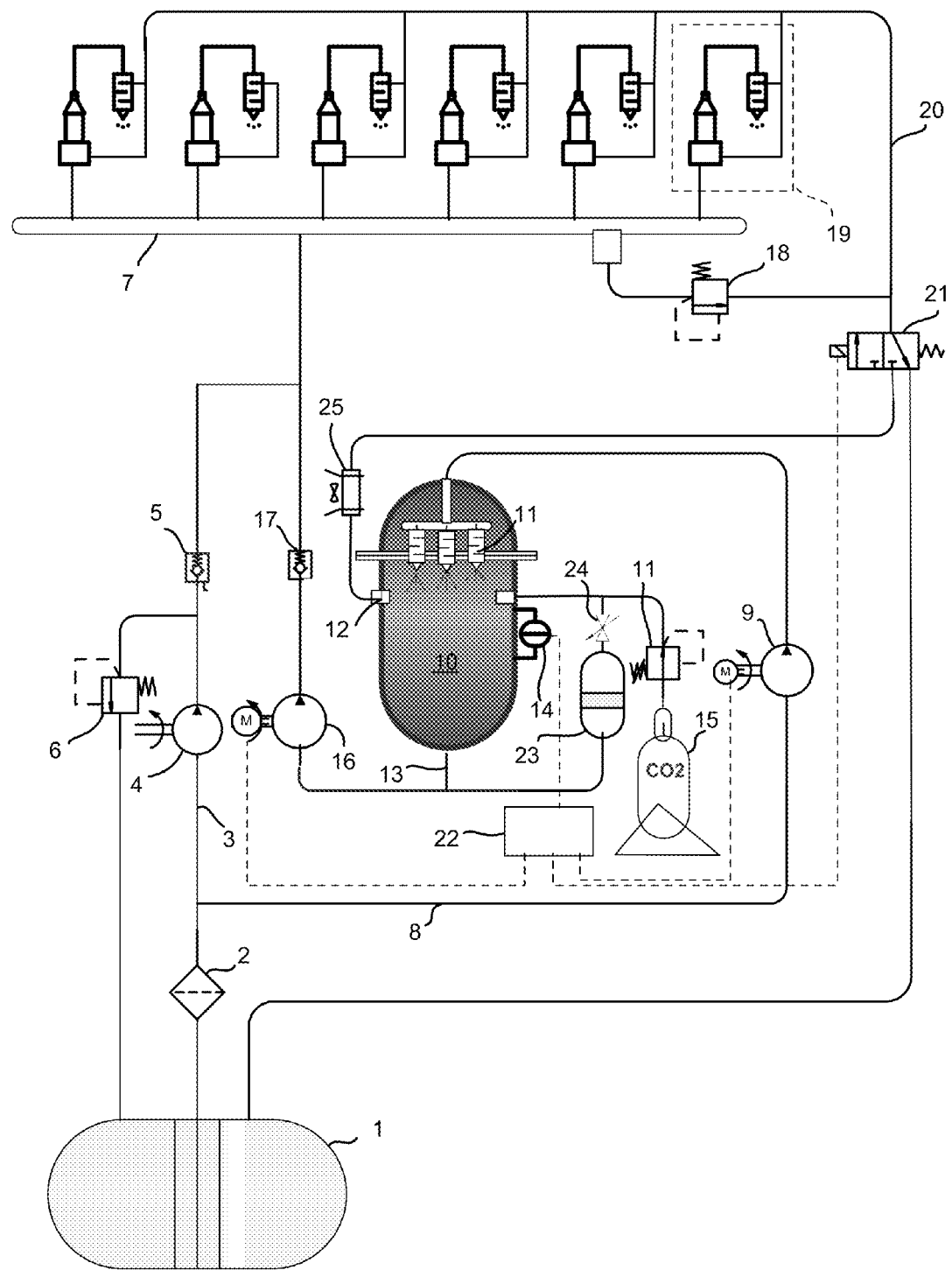

METHOD AND SYSTEM FOR FUEL SUPPLY TO A PUMP-INJECTOR UNIT OF A DIESEL ENGINE

BACKGROUND OF THE INVENTION

Field of the Invention

The present invention relates to the field of internal combustion engines and to the fuel delivery to the combustion chambers of diesel engines. More particularly, the invention is directed to unit pump-injector systems, delivering to the injectors of pump-injector units either liquid fuel or the fuel in a form of under-saturated solution in the liquid fuel of such gases as carbon dioxide or air or a mixture of gases to achieve a high degree of fuel atomization after injection.

It is common knowledge that atomization of a liquid fuel results in a highly developed active surface of this liquid fuel which allows more efficient fuel burning.

There are different ways to provide for effective atomization, for instance by increasing the pressure upstream from injectors. There are also known attempts to better atomize the fuel by dissolving in the fuel such gases as carbon dioxide or air and releasing the dissolved gas after injection.

Reference is had, in this context, to prior art patents, such as, for instance U.S. Pat. Nos. 4,596,210; 6,273,072; U.S. Pat. No. 7,011,048 B2; U.S. Pat. No. 7,523,747 B2, and U.S. Pat. No. 7,406,955 B1. Those Patents describe devices and methods that provide for implementation of the described effect.

For example U.S. Pat. No. 7,406,955 B1 describes a fuel conditioning system which particularly comprises the dissolution of such gases as carbon dioxide or air in the liquid fuel and release of the dissolved gas in the combustion chamber after injection. In all known unit injection systems there is considerable return of high temperature fuel from the pump-injection units to the fuel tank. The amount of returned high temperature fuel is higher than the amount of fuel injected to the combustion chambers. It means that if the returned fuel is fed back to the fuel tank, then the considerable part of the gas dissolved in the fuel released to the fuel tank even before injection. This not only decreases the effectiveness of the fuel atomization but also fills the fuel tank with the released gas, which, in turn, negatively influences the operation of fuel pumps.

Furthermore, in the systems built according to U.S. Pat. No. 7,406,955 B1 the level of the gas-saturated liquid in the special vessel is controlled by starting and stopping the feed pump, which creates pressure oscillations. Such oscillations decrease the average pressure of gas-fuel solution decreasing the effectiveness of atomization.

SUMMARY OF THE INVENTION

It is accordingly an objective of this invention to provide a method and apparatus which overcomes the above-mentioned disadvantages and which provides for further improvement in the fuel/gas solution injection to the combustion chamber.

Our experiments have shown that directing the fuel returned from the pump-injector units to the vessel that dissolves the gas, through a temperature decreasing cooler considerably increases the effectiveness of atomization. It separates the part of the system working with the pure liquid fuel from the part of the system working with the fuel/gas solution thus considerably improving the operation of pumps. It also makes possible the easy switching from the operation with pure liquid fuel to the operation with fuel/gas solution.

Our experiments also have shown that connecting a fuel accumulator to the outlet of the vessel dissolving the gas significantly reduces the amplitude of pressure oscillations in the vessel. The decrease of pressure oscillations increases the average pressure inside of the fuel gasification vessel thus increasing the effectiveness of atomization.

With the above and other objects in view there is provided, in accordance with the invention, a diesel engine with pump-injector units for each engine cylinder, comprising:

electronically controlled cylinder pump-injector units with high pressure pumps each injecting fuel into a respective cylinder;

a low pressure common fuel manifold feeding the individual pump-injector units either by liquid fuel or by under-saturated fuel/gas solution;

two fluid lines feeding the low pressure fuel header;

a low pressure pump driven by engine shaft which feeds through a non-return valve one of the fluid lines; a pressure relieve valve installed between the low pressure pump and the non-return valve, returning an excess of fuel to a fuel tank thus maintaining the discharge pressure of the low pressure pump on the level $P_1$;

an engine fuel tank which feeds the engine shaft driven fuel pump through a filter, the fuel tank feeds also a feeding electro motor driven pump;

the feeding electro motor driven pump pumping the fuel from the engine fuel tank through the filter to a fuel gasification vessel;

the gas gasification vessel having at least one fuel dispersing nuzzle mounted for discharging fuel from the feed pump to the vessel, at least one gas inlet port for filling the vessel by pressurized gas, at least one inlet port for returned from the low pressure common fuel header and from the pump-injector units fuel, an outlet port and a level sensor electronically starting and stopping the feed pump;

a fuel accumulator, connected to the outlet port of the fuel gasification vessel, the fuel accumulator decreases the pressure oscillations caused by starting and stopping the feed pump;

a gas source and a gas line connecting an outlet port of the gas supply source to a gas pressure regulator maintaining the pressure in the gasification vessel on the level $P_3$ which is lower than level $P_2$, the level $P_3$ provides for higher saturation level than the saturation level which corresponds to the conditions present in combustion chambers at the time of injection;

an outlet port of the pressure regulator connected to the inlet gas port of the gasification vessel;

an electro motor driven pump operated by the control system and connected from its inlet side to an outlet of the gasification unit and from its outlet side to the low pressure fuel header;

a pressure regulator maintaining the pressure in the low pressure fuel header on the level $P_4$ which is higher than pressure $P_1$;

an electronic control system providing for the operation of fuel supply system;

a fuel return line from all individual pump-injector units connected to two solenoid valves, the first solenoid valve, operated by control system, directs the return fuel to the fuel tank, the second solenoid valve directs the return fuel to the fuel gasification vessel through a cooler.

With the above and other objects in view, there is also provided, in accordance with the invention, a method of fuel gasification and supplying gasified fuel to a combustion process, the method which comprises:

providing a vessel for fuel gasification, the vessel having at least one dispersing nozzle, a gas feeding port, a gasified solution outlet port, a return fuel port and a level sensor for registering a level of gasified fuel in the vessel;

feeding the dispersing nozzle by an electromotor driven feed pump which creates the pressure $P_2$ upstream from the nozzle;

returning the excess of fuel/gas solution from the pump-injector units and from low pressure common fuel manifold to the vessel through a cooler decreasing the temperature of returned fuel solution;

maintaining a level of gasified fuel in the vessel by starting and stopping the feed pump operated by the level sensor;

feeding the vessel by pressurized gas such as carbon dioxide or air;

providing the pressure $P_3$ of pressurized gas in the vessel on the level capable to create a saturation level of fuel/gas solution which exceeds the saturation level under the conditions present in the combustion chambers in the time of injection;

decreasing the oscillations of pressure $P_3$ by using a fuel accumulator connected to the outlet port of the fuel gasification vessel;

pressurizing the solution produced by the gasification vessel up to the level $P_4$, thus changing its state from saturated to under-saturated and directing the under-saturated solution to a low pressure common manifold;

feeding the pump-injector individual units from the low pressure common manifold;

rapidly releasing the gas dissolved in the fuel/gas solution after injection to the combustion chamber.

With the above and other objects in view there is also provided, in accordance with the invention, a fuel delivery system of a diesel engine to pump-injector individual units, comprising:

a fuel tank;

a fuel filter directing the fuel from the fuel tank to two fluid lines;

a first fuel line feeding an engine shaft driven pump;

a discharge fluid line of the engine shaft driven pump directing the pressurized fuel to a common low pressure fuel manifold through a non-return valve;

a relief valve maintaining the pressure $P_1$ upstream from the non-return valve, the relief valve directing an excess of fuel back to the fuel tank;

a second fluid line directing the fuel from the fuel filter to an electro motor driven feed pump;

the electro motor driven feed pump which supplies the pressurized fuel to a fuel gasification vessel;

a gas supply supplying the gasification vessel by pressurized gas, such as carbon dioxide or air;

a pressure regulator maintaining the pressure of gas feeding the gasification vessel on the level $P_3$;

the fuel gasification vessel having at least one inlet nozzle dispersing the pressurized by the feed pump fuel, the gasification vessel having also a gas inlet port, an inlet port for returned fuel and an outlet port for gasified fuel solution, the gasification vessel providing for level of saturation of the fuel by the gas entering the vessel which is higher than level of saturation under the conditions present in combustion chambers at the time of injection;

a level control maintaining the level of saturated solution inside of the gasification vessel by starting and stopping the electro motor driven feed pump;

a fuel accumulator connected to an outlet of the gasification vessel for decreasing the pressure oscillations. in the fuel gasification vessel connected to an outlet of;

a fluid line connecting the outlet port of gasification vessel to a second electro motor driven pump;

the second electro motor driven pump increasing the pressure of saturated solution to the level $P_4$, which is higher than pressure $P_3$, thus changing its state from saturated to under-saturated;

a fluid line connecting the second electro motor driven pump to the common low pressure fuel header through a non-return valve;

a pressure regulator controlling the pressure $P_4$ in the common low pressure fuel header by returning the excess of fuel to the gasification vessel;

a fuel return line connecting a returned from individual pump-injector units fuel to a three-way solenoid valve, the valve being operated by a control system;

the three-way solenoid valve directing the return from all individual pump-injector units either to the fuel tank or to the fuel gasification vessel. The solenoid valve is also operated by the control system.

The control system provides for two modes of operation, namely: a first mode of operation wherein the control system directs through the three way solenoid valve the fuel returned from individual pump-injector units to the fuel tank and shuts the second electro motor driven pump down, and a second mode of operation wherein the control system directs fuel return from individual pump-injector units to the fuel gasification vessel and starts the second electro motor driven pump, the second electro motor driven pump being started increases the pressure in the common low pressure fuel header to the level $P_4$, thus closing the corresponding non-return valve and redirecting the output of the pump from the common low pressure fuel header to the fuel tank.

Once more in summary, the invention is directed to pump-injector systems that deliver to the injectors of pump-injector units either liquid fuel or the fuel in a form of under-saturated solution in the liquid fuel of such gases as carbon dioxide or air or a mixture of gases to achieve a high degree of fuel atomization after injection.

More particularly, a fuel supply method is applicable to unit pump-injector systems of diesel engines. A liquid diesel fuel from the engines fuel tank is directed trough a fuel filter to the two fuel lines. The first of them delivers the fuel to a low pressure pump driven by engine shaft. Said pump feeds trough the non-return valve a common low pressure fuel manifold, which distributes the fuel between the pump-injector units of engine cylinders. The discharge pressure of said pump $P_1$ is controlled by returning an excess of fuel back to the fuel tank. The second fuel line delivers the fuel from the filter to the electro motor driven feed pump. Said pump feeds through the plurality of nozzles a gasification vessel, which is pressurized by such gas as carbon dioxide or air to the pressure level $P_2$. Said vessel saturates the fuel by pressurized gas and direct the resulted solution to a second electro motor driven pump. Said pump increases the solution pressure up to the level $P_3$, which is higher than the pressure level $P_1$. As the result, said solution becomes under-saturated. Both electro motor driven pumps are operated by a control system. Said system controls the level of said solution in said gasification vessel by starting and stopping said feed pump. It also provides for two modes of operation. Under the first mode said second electro motor driven pump is stopped and said low pressure fuel header receives the fuel only from said pump driven by engine shaft. Under the second mode said second electro motor driven pump is working increasing the pressure in said low pressure fuel manifold to the level $P_3$. As the result the non-return valve located upstream from said pump driven by the engine shaft is closed and the fuel produced by said pump is directed to the fuel tank. Under the second mode of operation said pressure level $P_3$ is controlled by return of fuel solution excess to said gasification vessel. There is also high temperature fuel return line from the pump-injector units which under the first mode of operation directs the fuel to the fuel tank and under second mode of operation directs the fuel to said fuel gasification vessel through a cooler. When the level control starts said electro motor feed pump, said pump trough said dispersing nozzles increases the level of fuel inside of said gasification vessel, thus increasing the pressure inside of it. After said electro motor driven pump is stopped, the pressure inside said gasification unit gradually decreases. To decrease amplitude of pressure oscillations in said gasification vessel a hydraulic accumulator is connected to the outlet of said gasification vessel.

Others features which are considered as characteristic for this invention are set forth in the appended claims.

Although the invention is illustrated and described herein as embodied in a method and system for diesel fuel gasification, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

BRIEF DESCRIPTION OF THE DRAWING

The FIGURE is a diagrammatic view of the fuel supply in a fuel supply system for a diesel engine with individual pump-injector units.

DETAILED DESCRIPTION OF THE INVENTION

Referring now to the sole FIGURE of the drawing in detail, the system comprises a fuel tank 1, a fuel filter 2, and a fuel line 3 delivering the fuel from the fuel filter 2 to a pump 4. Here, the pump 4 is driven by the engine shaft. The pump 4 pumps pressurized fuel to a low pressure common header 7 through a non-return or check valve 5. A pressure relief regulator 6 controls the discharge pressure of the pump 4 by returning the excess of fuel to the tank 1. A fuel line 8 connects the filter 2 to a feed pump 9 driven by electro motor. Said feed pump 9 delivers the fuel to a fuel gasification vessel 10 with at least one dispersing nozzle 11, one inlet port 12 for returned fuel, one outlet port 13 and a level controller 14 controlling the level of gasified fuel by starting and stopping the pump 9. Said fuel gasification vessel 10 has also a gas inlet port connected to a gas source 15 with a pressure controller 11 controlling the pressure in the vessel 10 at a pressure level $P_3$. The fuel injected through the nozzle 11 is saturated by pressurized gas such as carbon dioxide, air or another gas.

The level of pressure $P_3$ in the vessel 10 is maintained to exceed the level of saturation under the conditions present in the combustion chambers. An outlet port 13 of the vessel 10 is connected to a fuel accumulator 23 and to an electro motor-driven pump 16. The fuel accumulator 23 is also connected to a gas supply line through a shut-off valve 24. The pressure in said accumulator 23 is set to a pressure level $P_3$. When the feed pump 9 is started by level control, the volume of fuel delivered to the vessel 10 is accumulated in the accumulator 23, preventing the pressure $P_3$ from increasing to a significant degree. When the feed pump 9 is stopped, said accumulator 23 prevents the pressure $P_3$ from significant decrease thus decreasing pressure oscillations in the vessel 10. The pump 16 increases the pressure of saturated solution. The resulting under-saturated solution is fed through a non-return valve 17 to said low pressure common fuel header 7.

A pressure $P_4$ in the header 7 is maintained by a relief pressure controller 18 which returns the excess of fuel to a common return line 20 that also collects the spillovers from all of the pump-injector units 19. A three-way solenoid valve 21 that is operated by the control system 22 directs the returned fuel either to the fuel tank 1 or to the fuel gasification unit 10 through a cooler 25. The cooler 25 prevents a significant temperature increase in the vessel 10, which helps to create the necessary level of saturation.

The control system 22 with a two-way switch provides for two operating modes. Under the first mode of operation said pump 16 is not working, said non-return valve 17 is closed, said non-return valve 5 is open, said pressure controller 6 controls the pressure in said manifold 7, said pressure controller 18 cuts-of the return to said line 20, said three-way solenoid valve 21 directs the fuel, returned from said pump-injector units 19, to the fuel tank 1. In this mode of operation the pump-injector units 19 are supplied by the fuel directly from the fuel tank 1. The fuel saturated by gas is stored in the fuel gasification vessel 10 and separated from the rest of the fuel supply system. Under the second mode of operation said pump 16 is started. It opens the non-return valve 17, increases the pressure in said common manifold 7, closes said non-return valve 5 and separates the low pressure pump 4 from said manifold 7. Simultaneously said three-way valve 21 is switched directing the fuel, returned from said manifold 7 and said pump-injector units 19, to the fuel gasification vessel 10 through the cooler 25. As a result, all gas dissolved in the fuel will remain in the saturated or under-saturated fuel/gas solution feeding the individual pump-injector units.

The invention claimed is:

1. A fuel supply system for a diesel engine with individual pump-injector units, comprising:

a fuel tank;

a first fuel line connected to said fuel tank, active in a first mode of system operation, and a low pressure pump in said first fuel line, which directs the fuel to a common low pressure inlet manifold of the individual pump-injector units, a non-return valve and the relief pressure regulator for controlling the pressure in said low pressure common manifold on the level $P_1$;

a second fuel line, active in a second mode of system operation, and a high-pressure feed pump connected in said second fuel line and pumping the fuel at a pressure $P_3$;

a fuel gasification vessel for saturating the diesel fuel with a gas, at least one fuel dispersing nozzle connected to said high-pressure feed pump for discharging the fuel supplied by said feed pump into said fuel gasification vessel, said fuel gasification vessel further having at least one gas inlet port for feeding gas into said fuel gasification vessel, at least one inlet port for fuel returned from said low pressure common manifold, and an outlet port, a gas source for feeding gas to said fuel gasification vessel, and a gas pressure regulator configured to regulate a gas pressure in said fuel gasification vessel at a pressure level $P_2$;

a level sensor measuring a fill level of liquid in said fuel gasification vessel, said level sensor controlling the liquid level in said fuel gasification vessel by starting and stopping said electro motor driven feed pump, a gas/fuel solution pump, active in the second mode of system operation, receiving gas-saturated fuel from said outlet of the fuel gasification vessel, said pump increasing a pressure of the gas/fuel solution to a pressure level $P_4$ and pumping the resulting under-saturated solution to said low pressure inlet common manifold;

a fuel accumulator connected to said outlet of said fuel gasification vessel, said fuel accumulator decreasing a fluctuation in the pressure $P_2$ resulting from starting and stopping said feed pump;

a pressure relief regulator controlling a pressure in said low pressure common inlet manifold at the level $P_4$ by directing excess fuel to a common return line;

said common return line collecting the fuel from said pressure relief regulator and fuel returned from said individual pump-injector units;

a return valve operated by a control system, said valve, in the first mode of system operation directing the fuel from said common return fluid line to said fuel tank and, in the second mode of system operation directing the return fuel to said fuel gasification vessel; and a cooler connected between said common return line and said inlet return port of said fuel gasification vessel for reducing a temperature of the fuel fed back into said fuel gasification vessel.

2. The fuel supply system according to claim 1, wherein:

said fuel tank is connected to feed said first and second fuel lines through a fuel filter;

said low pressure pump in said first fuel line is driven by an engine shaft;

said high-pressure feed pump in said second fuel line is an electro-motor driven pump;

a gas source for feeding gas to said fuel gasification vessel, and a gas pressure regulator configured to regulate a gas pressure in said fuel gasification vessel at a pressure level $P_2$;

said gas/fuel solution pump is an electro-motor driven low head pump pumping the under-saturated solution to said low pressure inlet common manifold through a non-return valve connected to an outlet of said electro-motor driven low head pump, said return valve is a three-way solenoid valve operated by the control system.

3. The system according to claim 1, which comprises a control system configured to selectively operate the fuel supply system in a first mode of system operation and in a second mode of system operation, wherein:

in the first mode said gas/fuel solution pump and said high-pressure feed pump are stopped and said low pressure common inlet manifold for the individual pump-injector units is supplied only by said low pressure pump, maintaining the pressure in said manifold at the pressure level $P_1$;

in the second mode said low head pump is activated and increases the pressure in said common manifold to the pressure level $P_4$ and separates said high-pressure feed pump from said common manifold by the corresponding non-return valve, and wherein said control system, in the second mode of operation, switches said return valve to redirect the common return line from feeding back to the fuel tank to feeding back to the fuel gasification vessel through said cooler.

4. The system according to the claim 1, wherein the fuel pressure $P_3$ is set higher than the fuel pressure $P_2$ to insure a pressure drop sufficient for satisfactory fuel dispersion by said nozzle.

5. The system according to the claim 1, wherein the pressure level $P_4$ is set higher than the pressure level $P_1$ to ensure a separation of said low pressure pump from said common low pressure inlet manifold of the individual pump-injector units in the second mode of system operation.

6. A method of supplying diesel fuel to a manifold for injection into a combustion chamber of a diesel engine, the method which comprises:

gasifying the diesel fuel and supplying an under-saturated gas-fuel solution to a low pressure common inlet manifold of individual pump-injector units for injection into the combustion chamber;

providing a vessel for fuel gasification, said vessel having a housing, at least one fuel dispersing nozzle, a gas inlet port, an inlet port for fuel returned from the manifold and from the pump-injector units, an outlet port for saturated fuel, and a level sensor for registering a level of saturated fuel in the vessel;

feeding a gas to the vessel with a gas pressure $P_2$ from a gas source;

feeding the diesel fuel to the vessel from a high pressure electro-motor-driven feed pump at a pressure $P_3$, which is higher than the gas pressure $P_2$, to satisfactorily disperse the diesel fuel through said nozzle;

starting said high pressure feed pump upon receiving a signal from the level sensor indicating a low level of saturated fuel in the gasification vessel and stopping the pump upon receiving a signal from the level sensor indicating a high level of saturated fuel in the vessel;

connecting a fuel accumulator to the outlet of the gasification vessel, effective to decrease an amplitude of pressure oscillations caused by the starting and stopping of the feed pump;

directing saturated fuel from the outlet of the gasification vessel to an inlet of a low head pump, and increasing the fuel pressure in the low head pump and changing a state of the fuel solution from saturated to under-saturated;

maintaining the pressure in said low pressure common inlet manifold of individual pump-injector units at a pressure level $P_4$ by directing excess of fuel to a common return line;

directing spillovers from the individual pump-injector units to a common return line connected to the gasification vessel;

cooling the fuel in the common return line to cause a further decrease of a temperature in the gasification vessel; and providing a pressure level and a temperature in the gasification vessel to ensure a level of saturation in the gasification vessel that is higher than a level of saturation under a pressure and a temperature that is present in the combustion chamber.

* * * * *